United States Patent Office 2,925,876
Patented Feb. 23, 1960

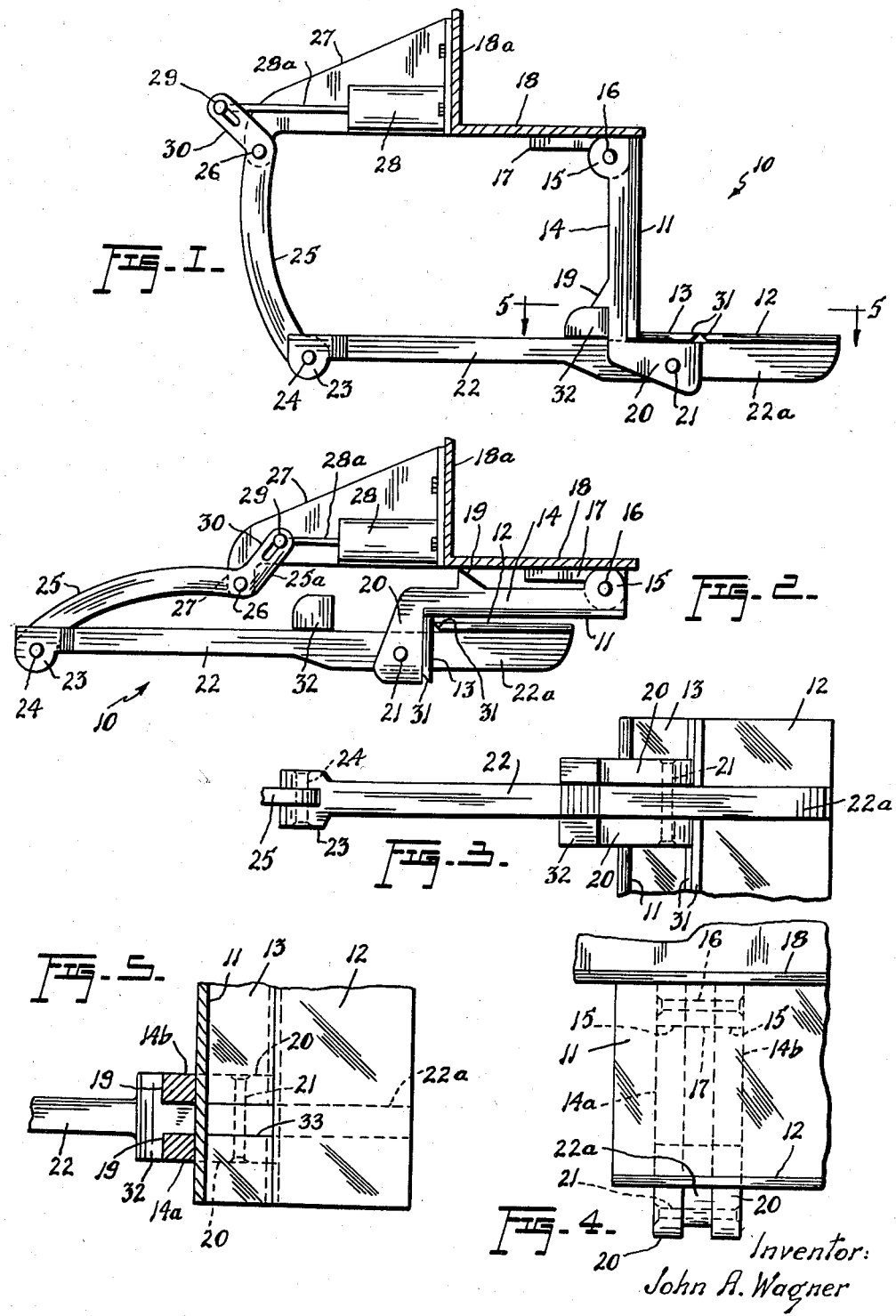

2,925,876

RETRACTABLE VEHICLE STEPS

John A. Wagner, Weatherly, Pa.

Application April 28, 1958, Serial No. 731,310

1 Claim. (Cl. 182—91)

This invention relates to new and useful improvements in retractable steps for vehicles such as buses, street cars, railroad cars, trucks and other similar conveyances, and the principal object of the invention is to facilitate safe and convenient embarkation and disembarkation of persons on and from such vehicles where the distance of the usual steps from the ground is too excessive to permit safe and convenient stepping.

As such, the invention is in the nature of an auxiliary step which is adapted to be used under the lowermost of the usual steps with which the vehicle is provided, and an important feature of the invention resides in the ability of the auxiliary step to be retracted into a compact, folded form wherein it is disposed unobtrusively under the vehicle and does not materially interfere with the customary clearance of the vehicle above ground.

Some of the advantages of the invention reside in its simplicity of construction, in its convenient and dependable operation, and in its adaptability for use with vehicles of various sizes and types.

With the foregoing more important objects and features in view and such other objects and features as may become apparent as this specification proceeds, the invention will be understood from the following disclosure taken in conjunction with the accompanying drawings, wherein like characters of reference are used to designate like parts, and wherein:

Figure 1 is a side elevational view of the invention installed under the lowermost of the usual steps of a vehicle, the invention being shown in its operative position;

Figure 2 is a side elevational view, similar to that in Figure 1, but showing the invention in its retracted position;

Figure 3 is a fragmentary underside plan view of the invention;

Figure 4 is a fragmentary outer view thereof; and

Figure 5 is a fragmentary sectional view, taken substantially in the plane of the line 5—5 in Figure 1.

Referring now to the accompanying drawings in detail, the retractable step in accordance with the invention is designated generally by the reference numeral 10 and, as a step, includes a normally vertical riser plate 11 and a tread consisting of a tread plate 12 and a tread strip 13 which are in horizontal alignment when the device is in its operative position as shown in Figure 1.

The plates 11, 12 and the strip 13 are of any suitable length as required by the particular vehicle with which the invention is to be used, and linkage means are provided, as hereinafter described, for retractably supporting the parts 11, 12, 13, such linkage being arranged in sets disposed at or adjacent both ends of these parts 11, 12, 13, and also intermediate the ends of these parts, if necessary, when these parts are of considerable length. Inasmuch as the arrangement of the linkage in the several sets is the same, an illustration and description of one set will suffice for all. The linkage means in each set comprises a vertical riser member 14 which consists of two, spaced, identical components 14a, 14b, provided at their upper ends with apertured ears 15 to receive a pivot pin 16 whereby they are connected to a bearing bracket 17. The bracket 17 is suitably secured to the underside of the lowermost step 18 of the usual steps with which the vehicle is equipped, it being noted that the bracket 17 is disposed between the ears 15 of the two riser member components 14a, 14b. The aforementioned riser plate 11 is suitably secured to the outer edges or faces of the components 14a, 14b, while the inner edges or faces of these components are provided with integral lugs 19, the purpose of which will be hereinafter described.

The lower ends of the components 14a, 14b are provided integrally with outwardly projecting, horizontal extensions 20 which have the tread strip 13 suitably secured thereto and which are apertured to receive a pivot pin 21 whereby they are connected to an intermediate portion of a substantially horizontal connecting member 22. The extensions 20 straddle the member 22 and the latter projects both outwardly and inwardly from the pivot pin 21. The forwardly projecting portion 22a of the member 22 has suitably secured thereto the aforementioned tread plate 12, while the inner end of the member 22 is provided with a fork 23 which is connected by a pivot pin 24 to the lower end of a lever 25. The upper end of the latter is connected by a pivot pin 26 to a suitable bracket 27 secured to the inside of a riser 18a of the aforementioned step 18. If desired, the pivot pin 26 may be provided on some convenient frame member or other structure existing at the underside of the vehicle, thus eliminating the use of the bracket 27.

In any event, the location of the pivot pins 16, 21, 24 and 26 is such that the members 14, 22, the lever 25 and the portion of the vehicle between the pins 16, 26 form four sides of a parallelogram, so that when the parts are swung about the several pivots, the auxiliary step may be retracted from its operative position shown in Figure 1 to a folded position shown in Figure 2, wherein the members 14, 22 and the lever 25 are disposed in a substantially horizontal position under the step 18. As such, the folded step is very compact in form and unobtrusive, so that it does not materially interfere with the customary clearance of the vehicle above ground. As shown in Figure 5, the tread strip 13 is provided with an open slot or cut-out portion 33 to receive the member 22 when the step is retracted.

Any suitable means may be employed for folding and unfolding the step, such as for example, a hydraulic or compressed air cylinder 28 secured either to the riser 18a or to the bracket 27, and having its piston rod 28a operatively connected as at 29 to an extension 30 of the lever 25. When several of the linkage units are used to support the auxiliary step, the actuating means 28, 30 need be provided on the lever 25 of only one of such units. Also, if desired, the power cylinder 28 need not be employed and the lever extension 30 may be actuated manually by suitable linkage.

As already noted, the tread plate 12 and the strip 13 are in horizontal alignment when the step is in its operative position and the contiguous edges 31 of these parts are undercut or bevelled to permit sufficient clearance for these parts to break when retraction of the auxiliary step takes place.

A transversely elongated support block 32 is provided integrally on top of the connecting member 22 and supportably abuts the inner sides or faces of the components 14a, 14b when the step is in its operative position. Moreover, the aforementioned lugs 19 in that position abut the top of the block 32, whereby the step is held substantially rigid while in use and strain on the pivot pin 21 is materially lessened.

While in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claim.

What is claimed as new is:

A retractable vehicle step, comprising in combination, inner and outer bearing bracket means adapted to be secured to a vehicle body, an upright riser member pivoted at its upper end to the outer bracket means, an outwardly projecting horizontal extension provided integrally at the lower end of said riser member, a substantially horizontal connecting member pivoted intermediate its ends to said extension and projecting outwardly and inwardly therefrom, the outer portion of said connecting member being horizontally aligned with the extension and coacting therewith to provide a tread member when the step is in its operative position, a riser plate secured to said riser member, a tread plate secured to the outer portion of said connecting member, a tread strip secured to said extension, said tread strip being co-planar with said tread plate when the step is in its operative position, an upwardly projecting support block provided on said connecting member, an inwardly projecting lug provided at the inside of said riser member said block supportably engaging the inside of the riser member and said lug being in supporting engagement with the top of said block when the step is in its operative position, a lever pivoted to the inner end of said connecting member and extending upwardly therefrom, the upper end of said lever being pivoted to said inner bracket means, and means for actuating said lever whereby the latter and said riser member and said connecting member may be swung to a folded position under the vehicle body.

References Cited in the file of this patent

UNITED STATES PATENTS

| | | |
|---|---|---|
| 1,089,481 | Kunzelman | Mar. 10, 1914 |
| 1,250,659 | Ritchie | Dec. 18, 1917 |
| 1,449,031 | Blake | Mar. 20, 1923 |